US012251669B2

(12) United States Patent
Athey et al.

(10) Patent No.: US 12,251,669 B2
(45) Date of Patent: Mar. 18, 2025

(54) SHEAR FLOW NANOBUBBLE GENERATOR

(71) Applicant: En Solución, Inc., Austin, TX (US)

(72) Inventors: Alex Edward Athey, Austin, TX (US); Dirk Thiele, Austin, TX (US)

(73) Assignee: EN SOLUCIÓN, Austin, TX (US)

( * ) Notice: Subject to any disclaimer, the term of this patent is extended or adjusted under 35 U.S.C. 154(b) by 123 days.

(21) Appl. No.: 17/233,221

(22) Filed: Apr. 16, 2021

(65) Prior Publication Data

US 2022/0331750 A1 Oct. 20, 2022

(51) Int. Cl.
*B01F 23/23* (2022.01)
*B01F 23/231* (2022.01)
*B01F 23/2373* (2022.01)

(52) U.S. Cl.
CPC .................. *B01F 23/23123* (2022.01); *B01F 23/231264* (2022.01); *B01F 23/2373* (2022.01)

(58) Field of Classification Search
CPC ........ B01F 23/23123; B01F 23/231264; B01F 23/2373
See application file for complete search history.

(56) References Cited

U.S. PATENT DOCUMENTS 3,490,752 A * 1/1970 Danjes ...................... C02F 3/20 261/DIG. 70
4,193,950 A * 3/1980 Stockner ............ B01F 23/2331 261/87
4,521,349 A * 6/1985 Weber ............... B01F 23/23123 261/93
4,549,477 A 10/1985 McCabe, Jr.
4,897,204 A * 1/1990 Katoh ............... B01F 25/31421 210/220
(Continued)

FOREIGN PATENT DOCUMENTS

CN 201388489 Y 1/2010
CN 203269933 * 11/2013
(Continued)

OTHER PUBLICATIONS

EPO translation of CN203269933 (Year: 2013).*
(Continued)

*Primary Examiner* — Stephen Hobson
(74) *Attorney, Agent, or Firm* — MARSHALL, GERSTEIN & BORUN LLP

(57) ABSTRACT

A system may include a nanobubble generator that uses a shearing force applied by a fluid received through a fluid inlet and a negative pressure applied to an outlet by a pump to provide a vacuum-assisted shear flow nanobubble generator system. In some implementations, the system may include a nanobubble generator including a porous component including a chamber coupled to receive a gas and including a surface having a plurality of gas-permeable openings. The nanobubble generator may include an inlet and an outlet on opposing sides of the porous component to direct the fluid across the openings. The system may include a pump to apply a negative pressure to the outlet of the nanobubble generator. The negative fluid pressure and the fluid flow across the openings cooperate to form nanobubbles at low injected gas pressures, increasing the efficiency of production of nanobubble solutions with pressure sensitive gasses, such as ozone.

12 Claims, 7 Drawing Sheets

(56) References Cited

U.S. PATENT DOCUMENTS 5,049,320 A * 9/1991 Wang ........................ C02F 3/12 261/122.1
5,078,921 A * 1/1992 Zipperian ......... B01F 23/23211 261/122.1
RE33,899 E * 4/1992 Tyer .................. B01F 23/23123 261/DIG. 70
5,151,187 A * 9/1992 Behmann ................ C02F 1/444 210/195.3
5,256,299 A 10/1993 Wang et al.
5,316,682 A * 5/1994 Keyser .................... C02F 3/201 210/195.3
5,419,353 A 5/1995 Chen
5,525,242 A * 6/1996 Kerecz ............ B01F 25/431971 210/220
5,540,836 A 7/1996 Coyne
5,599,137 A 2/1997 Stephenson et al.
5,660,718 A 8/1997 Chudacek et al.
5,824,243 A 10/1998 Contreras
5,876,558 A 3/1999 Deng et al.
6,021,788 A 2/2000 King
6,082,548 A 7/2000 Stephenson et al.
6,237,897 B1 * 5/2001 Marina ................. B01F 25/314 261/76
6,848,455 B1 2/2005 Shrinivasan et al.
7,244,401 B1 7/2007 O'Ham
7,255,332 B2 8/2007 Osborn et al.
7,278,434 B2 10/2007 Huang
7,425,301 B2 9/2008 Gillette et al.
7,591,452 B2 * 9/2009 Kohama ........... B01F 23/23123 261/DIG. 26
7,628,183 B2 * 12/2009 Dorsch ................... B05B 1/267 141/285
7,628,912 B2 12/2009 Yamasaki et al.
7,790,944 B2 9/2010 O'Ham
7,803,272 B2 9/2010 Yamasaki et al.
7,874,546 B2 1/2011 Park
7,914,677 B2 3/2011 Yamasaki et al.
7,955,631 B2 6/2011 Turatti
8,016,041 B2 9/2011 Kerfoot
8,137,703 B2 3/2012 Chiba et al.
8,205,277 B2 6/2012 Yamasaki et al.
8,225,856 B2 7/2012 Kerfoot
8,317,165 B2 11/2012 Yamasaki et al.
8,573,303 B2 11/2013 Kerfoot
8,735,337 B2 5/2014 Lynn
8,906,241 B2 12/2014 Kerfoot
8,919,747 B2 * 12/2014 Anzai ............... B01F 23/23123 261/122.1
9,044,794 B2 * 6/2015 Holsteyns ......... H01L 21/67051
9,119,284 B2 8/2015 Sanematsu
9,144,774 B2 * 9/2015 Livshits .................. B01F 25/21
9,266,073 B2 2/2016 Kerfoot
9,392,680 B2 7/2016 Sanematsu et al.
9,499,290 B2 * 11/2016 Niazi ..................... C12M 23/14
9,567,246 B2 * 2/2017 Ko .................... B01F 23/23124
9,586,186 B2 3/2017 Roe
9,694,401 B2 7/2017 Kerfoot
9,726,397 B1 8/2017 Martin et al.
9,764,254 B2 * 9/2017 Kobayashi .......... B01F 35/2134
9,845,253 B2 12/2017 Miller et al.
9,981,229 B2 * 5/2018 Matsunaga ......... B01F 23/2326
10,080,998 B2 9/2018 Roe et al.
10,259,730 B2 4/2019 Ball et al.
10,293,309 B2 5/2019 Tachibana et al.
10,315,202 B2 6/2019 Baldauf et al.
10,351,451 B2 7/2019 Takahashi
10,519,052 B2 12/2019 Ball et al.
10,626,036 B1 4/2020 Guoin
10,801,003 B2 * 10/2020 Jaques ................... C12M 27/02
10,842,153 B2 11/2020 Takahashi et al.
10,865,128 B2 12/2020 Ball
10,874,996 B2 12/2020 Tsuchiya et al.
10,875,803 B1 12/2020 Guoin
2002/0070467 A1 * 6/2002 Sherman ........... B01F 25/31421 261/87
2003/0230122 A1 12/2003 Lee
2005/0279713 A1 12/2005 Osborn et al.
2006/0016763 A1 1/2006 Kerfoot
2006/0054205 A1 3/2006 Yabe et al.
2006/0120213 A1 * 6/2006 Tonkovich ........ B01F 25/31425 366/144
2006/0284325 A1 * 12/2006 Kohama ........... B01F 23/23123 261/DIG. 26
2007/0267334 A1 11/2007 Osborn et al.
2007/0284316 A1 12/2007 Yamasaki et al.
2008/0061006 A1 3/2008 Kerfoot
2008/0237141 A1 10/2008 Kerfoot
2009/0023189 A1 * 1/2009 Lau ......................... B01F 33/30 435/91.2
2009/0051057 A1 2/2009 Kim et al.
2009/0201761 A1 * 8/2009 Matsuno ................. B01F 25/23 366/165.2
2009/0233839 A1 9/2009 Lynn
2009/0272697 A1 11/2009 Kerfoot
2009/0273103 A1 11/2009 Watanabe et al.
2010/0175181 A1 7/2010 Chen
2010/0326912 A1 12/2010 Noguchi et al.
2011/0194995 A1 * 8/2011 Rigler ..................... B01F 33/30 422/504
2012/0085530 A1 4/2012 Kerfoot
2012/0234772 A1 9/2012 Cunningham et al.
2012/0279925 A1 11/2012 Miller et al.
2013/0056076 A1 * 3/2013 Longman .......... B01F 23/23123 137/1
2013/0062060 A1 3/2013 Kerfoot
2013/0098753 A1 * 4/2013 Sanematsu ................ B08B 3/10 315/111.21
2013/0291316 A1 11/2013 Kim et al.
2013/0291794 A1 * 11/2013 Sanematsu ........... H05H 1/2406 118/688
2013/0315627 A1 11/2013 Sugiyama et al.
2013/0334955 A1 * 12/2013 Saitoh ..................... C01B 13/10 313/231.31
2014/0144844 A1 5/2014 Miller et al.
2014/0202965 A1 * 7/2014 Honda ................ B01F 25/4337 210/764
2014/0246366 A1 9/2014 Kerfoot
2014/0374347 A1 * 12/2014 Schneider ......... B01F 25/31421 210/629
2015/0123295 A1 5/2015 Kerfoot
2015/0151993 A1 6/2015 Kerfoot
2015/0176170 A1 6/2015 Bae et al.
2015/0176171 A1 6/2015 Kim
2015/0274557 A1 10/2015 Watson et al.
2015/0336112 A1 * 11/2015 Ramirez ................. B01F 31/80 261/61
2015/0368137 A1 * 12/2015 Miller ....................... C02F 9/00 210/709
2016/0136591 A1 * 5/2016 Simmons ............ B01F 25/3131 261/76
2016/0221848 A1 8/2016 Miller et al.
2016/0228834 A1 8/2016 Roe
2016/0243508 A1 * 8/2016 Jung ............... B01F 25/431971
2016/0257588 A1 * 9/2016 Schneider ............. B01F 23/232
2016/0325247 A1 11/2016 Roe
2017/0050155 A1 * 2/2017 Ueno ...................... C02F 3/201
2017/0128895 A1 5/2017 Roe et al.
2017/0210649 A1 7/2017 Takahashi
2017/0210650 A1 7/2017 Takahashi
2017/0215428 A1 * 8/2017 Takahashi ................. C02F 1/78
2017/0216794 A1 8/2017 Kamimura et al.
2017/0259218 A1 * 9/2017 Lin ......................... B01F 23/23
2017/0259219 A1 * 9/2017 Russell ................... C02F 1/685
2017/0348743 A1 12/2017 Kerfoot
2018/0134994 A1 * 5/2018 Steele ................... D06F 35/001
2018/0178173 A1 * 6/2018 Nakao ................. B01F 25/4341
2018/0258100 A1 9/2018 Gregory et al.
2018/0319685 A1 * 11/2018 Ball ........................ C02F 1/583
2018/0332787 A1 11/2018 Leo
2019/0060223 A1 * 2/2019 Yaniv ................... A61K 9/0019
2019/0105616 A1 * 4/2019 Baxter ................... B01D 5/003

(56) References Cited

U.S. PATENT DOCUMENTS

| | | | | |
|---|---|---|---|---|
| 2019/0210900 | A1 | 7/2019 | Ball et al. | |
| 2019/0232236 | A1* | 8/2019 | Nie | B01F 23/232 |
| 2019/0241452 | A1 | 8/2019 | Ball | |
| 2019/0248689 | A1 | 8/2019 | Miller et al. | |
| 2019/0262787 | A1* | 8/2019 | Yoo | B01F 27/422 |
| 2019/0344224 | A1* | 11/2019 | Griffiths | B01F 23/231 |
| 2019/0381466 | A1* | 12/2019 | Cho | B01F 25/45211 |
| 2020/0114319 | A1* | 4/2020 | Galbreath-O'Leary | B01F 23/23123 |
| 2020/0122098 | A1* | 4/2020 | Chen | B01F 23/23122 |
| 2020/0148565 | A1 | 5/2020 | Ball et al. | |
| 2020/0156018 | A1* | 5/2020 | Kiriishi | B01F 23/23123 |
| 2020/0164413 | A1 | 5/2020 | Iai et al. | |
| 2020/0165558 | A1* | 5/2020 | Shevitz | C12M 27/04 |
| 2020/0238230 | A1* | 7/2020 | Fujita | B01F 33/813 |
| 2020/0254468 | A1* | 8/2020 | Kubota | C02F 1/02 |
| 2020/0276515 | A1* | 9/2020 | Kubota | B01F 23/703 |
| 2020/0308032 | A1 | 10/2020 | Domrese et al. | |
| 2021/0001287 | A1 | 1/2021 | Kim | |
| 2021/0010356 | A1* | 1/2021 | Chen | E21B 43/168 |
| 2021/0024387 | A1 | 1/2021 | Miller et al. | |
| 2021/0030007 | A1 | 2/2021 | Takahashi et al. | |
| 2022/0331750 | A1* | 10/2022 | Athey | B01F 23/237613 |

FOREIGN PATENT DOCUMENTS

| | | | | |
|---|---|---|---|---|
| CN | 104287063 | A | 1/2015 | |
| CN | 204207049 | U | 3/2015 | |
| CN | 104475393 | A | 4/2015 | |
| CN | 104351922 | B | 6/2016 | |
| CN | 109475828 | A | 5/2017 | |
| CN | 206674965 | U | 11/2017 | |
| CN | 207544970 | U | 6/2018 | |
| CN | 108325402 | A | 7/2018 | |
| DE | 102012009282 | A1 * | 11/2013 | B01F 3/04269 |
| EP | 3144962 | A1 | 3/2017 | |
| GB | 2514202 | A | 11/2014 | |
| JP | 2008079895 | B2 | 4/2008 | |
| JP | 2009072649 | A | 4/2009 | |
| JP | 2009254984 | A | 11/2009 | |
| KR | 20110130283 | A | 12/2011 | |
| KR | 20130003277 | A | 1/2013 | |
| WO | WO-2004/030837 | A1 | 4/2004 | |
| WO | WO-2012157798 | A1 * | 11/2012 | B01F 3/04269 |
| WO | WO-2015064382 | A1 * | 5/2015 | B01F 3/04248 |
| WO | WO-2016006636 | A1 | 1/2016 | |
| WO | WO-2017132778 | A1 * | 8/2017 | |

OTHER PUBLICATIONS

International Preliminary Report on Patentability issued in PCT Patent Application No. PCT/US2020/021773 dated Jun. 12, 2020.

International Search Report issued in PCT Patent Application No. PCT/US2020/021773 dated Jun. 12, 2020.

Written Opinion of the International Searching Authority issued in PCT Patent Application No. PCT/US2020/021773 dated Jun. 12, 2020.

* cited by examiner

SHEAR FLOW NANOBUBBLE GENERATOR

GOVERNMENT SUPPORT

This invention was made with government support under 2019-33610-29764awarded by the National Institute of Food and Agriculture, and FD-R-006465 awarded by the Food and Drug Administration. The government has certain rights in the invention.

FIELD

The present disclosure is generally related to nanobubble generators, and more particularly to systems and methods including a vacuum-assisted shear flow nanobubble generator.

BACKGROUND

A nanobubble is a stable cavity of gas contained within a liquid matrix. At this time, there are no fully validated theories for the balance of forces that allow for stability of nanobubbles in solution. In fact, traditional bubble theory specifically states that nanobubbles are not stable and only have a half-life of microseconds. In reality, nanobubbles have been observed to have extremely long half-lives, allowing the nanobubbles to remain in solution for periods of weeks or even months. In contrast, microbubbles and macrobubbles show greater buoyancy than nanobubbles and tend to separate within a fluid flow, while nanobubbles may remain in solution.

The diameters of nanobubbles in solution may vary and are typically less than 1 micron. Microbubbles may have a diameter of about 1 to 50 microns, and macrobubbles may have diameters greater than 50 microns. The typical radius of a stable nanobubble is around 120 nm. The radius and stability of the nanobubbles have been shown to be influenced by liquid properties such as pH, salinity, temperature, other properties, or any combination thereof.

Nanobubbles have unique properties, which enable various applications. For example, nanobubbles have negative zeta potential (surface charge), which promotes separation of the nanobubbles in solution, improving stability. Smaller nanobubbles may have stronger surface charges than larger bubbles, limiting their coalescence. Further, nanobubbles lack enough buoyancy to reach a surface of the fluid and instead follow Brownian motion, such that the nanobubbles tend to remain suspended in water for long periods of time (weeks or months) until they dissolve, traveling randomly within the solution. The addition of nanobubbles to a liquid has been demonstrated to lower the surface tension of the liquid. Additionally, nanobubbles enable supersaturation with an order of magnitude greater than traditional dissolved gas limits.

There are many methods of generating nanobubbles, such as electrolysis, mechanical shear, filter membranes, porous glass or ceramics, saturation followed by pressure drop, and so on. Generally, nanobubbles are created by a “violent” mixing of gas and water through large pressure drops, high shear rates, or extensive mixing. A majority of industrial nanobubble generators use either pressure drops or gas injection at high shear flows. Both methods require the gas to experience high pressure relative to the liquid at positive fluid pressure that is typically moving at high velocity.

SUMMARY

Some gases, such as ozone, are known to have reduced stability at high pressure. Unfortunately, generation of ozone nanobubbles using high pressure and shear forces may result in inefficient bubble formation with low percentage retention of ozone as it recombines to form oxygen at elevated rates at high pressures, as well as undesired aggregation or combination of nanobubbles into larger microbubbles or release of the gas from the fluid mixture.

Embodiments of systems, methods, and devices described below that include a system including a nanobubble generator and a pump. The nanobubble generator may include a first inlet to receive a fluid at a first pressure, a second inlet to receive a gas at a higher pressure, and an outlet. The nanobubble generator may include a porous component over which the fluid may flow. The porous component may include a chamber to receive the gas from the second inlet and a surface having a plurality of gas-permeable openings to inject the gas into the flowing fluid. The pump may include an input coupled to the outlet of the nanobubble generator and may include an output coupled to one or more of a conduit or a tank to pump the solution from the nanobubble generator. The pump may apply a negative pressure at the outlet of the nanobubble generator, producing a negative pressure within the nanobubble generator. The negative pressure may cooperate with the fluid flowing across the plurality of gas-permeable openings to shear the injected gas to facilitate nanobubble production. The negative pressure inside the nanobubble generator may draw the gas into the solution. In some implementations, the negative pressure may enable formation of stable nanobubbles having an expanded size, facilitating bubble formation, and the bubbles may shrink to a more stable nanobubble size when exposed to the higher pressure as the pump pushes the nanobubble solution to the conduit or the tank.

In some implementations, the system may include a degassing valve coupled between the output of the nanobubble generator and the input of the pump to remove microbubbles or larger bubbles that might otherwise cause cavitation and damage the pump. The degassing valve may be integrated within the output of the nanobubble generator. In some implementations, the degassing valve may augment the contact time of the liquid with the gas contained in the microbubbles, further increasing efficiency of the system.

In some implementations, a system may include a nanobubble generator and a pump configured to provide a negative pressure to the nanobubble generator. The nanobubble generator may include a fluid inlet to receive a fluid, a gas inlet to receive a gas, a porous component including a plurality of gas-permeable openings to allow gas injection, and an outlet. The fluid may flow across the gas-permeable openings while the fluid flows from the fluid inlet to the outlet. The pump may include an inlet coupled to the outlet of the nanobubble generator and may include an outlet to provide a nanobubble solution to one or more of a conduit or a tank. The fluid pressure from the fluid and the negative pressure provided by the pump may cooperate to shear nanobubbles from the plurality of gas-permeable openings to form the nanobubble solution. In some aspects, a filter may be provided to remove bubbles that are larger than nanobubbles from the solution before the solution is provided to the inlet of the pump.

In other implementations, a system may include a pump, a nanobubble generator, and a filter. The pump may include an inlet coupled to an output of the nanobubble generator and may include an outlet coupled to one or more of a conduit or a tank. The nanobubble generator may include one or more fluid inlets to receive a fluid, a gas inlet to receive a gas, and the outlet coupled to the inlet of the pump to receive a negative pressure. The nanobubble generator may include a porous component including a chamber coupled to the gas inlet and including a plurality of gas-permeable openings through which the gas may be injected and across which the fluid flows from the one or more fluid inlets to the outlet. The filter may be disposed between the porous component and the inlet of the pump and may be configured to remove bubbles larger than nanobubbles. A fluid pressure from the fluid and a negative pressure provided by the pump may cooperate to shear nanobubbles from the plurality of gas-permeable openings to form a bubble solution that passes through the filter to produce a nanobubble solution.

In still other implementations, a system may include a pump and a nanobubble generator. The nanobubble generator may include a fluid inlet to receive a fluid, a gas inlet to receive gas from a gas source, and an outlet. The nanobubble generator may include a porous component including a chamber to receive the gas and a surface including a plurality of gas-permeable openings. The fluid may flow from the fluid inlet to the outlet across the surface. The pump may include an inlet coupled to the outlet of the nanobubble generator and may include an outlet to supply a nanobubble solution to a conduit or a tank. The pump may supply a negative pressure to the porous component and the fluid may flow across the surface to shear the gas from the openings to form the nanobubble solution.

BRIEF DESCRIPTION OF THE DRAWINGS

The detailed description is set forth with reference to the accompanying figures. In the figures, the left most digit(s) of a reference number identifies the figure in which the reference number first appears. The use of the same reference numbers in different figures indicates similar or identical items or features.

Figure 1:
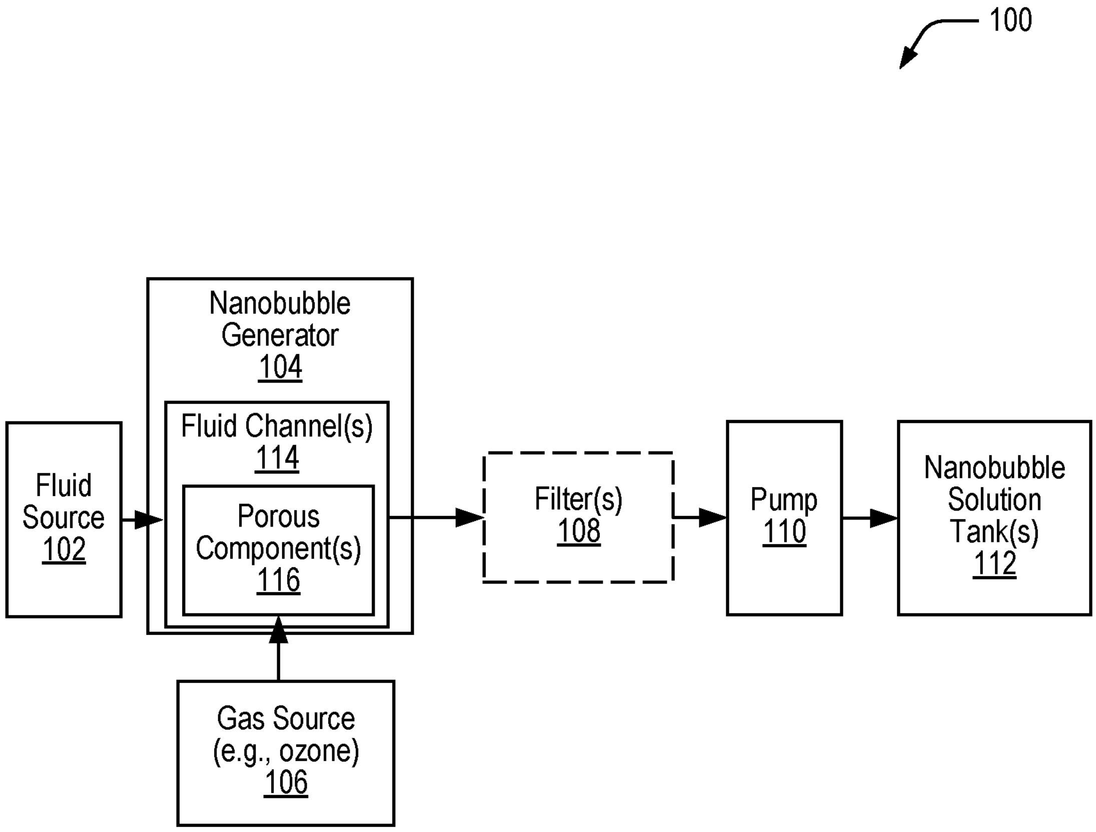
FIG. 1 depicts a block diagram of a system including a vacuum-assisted shear flow nanobubble generator, in accordance with certain embodiments of the present disclosure.

While implementations are described in this disclosure by way of example, those skilled in the art will recognize that the implementations are not limited to the examples or figures described. It should be understood that the figures and detailed description thereto are not intended to limit implementations to the particular form disclosed, but on the contrary, the intention is to cover all modifications, equivalents, and alternatives falling within the spirit and scope as defined by the appended claims. The headings used in this disclosure are for organizational purposes only and are not meant to limit the scope of the description or the claims. As used throughout this application, the work "may" is used in a permissive sense (in other words, the term "may" is intended to mean "having the potential to") instead of in a mandatory sense (as in "must"). Similarly, the terms "include", "including", and "includes" mean "including, but not limited to".

DETAILED DESCRIPTION OF ILLUSTRATIVE EMBODIMENTS

An ozone nanobubble solution may be used to purify water for numerous applications including cleaning applications (automotive, carpet, industrial equipment, and so on), organic cleaning solutions (vegetable baths, fruit baths, and so on), water reclamation (black water recycling, fracking fluid reclamation, and so on), and other applications. Typically, in cleaning solution applications, cleaning fruits, vegetables, or other objects in a nanobubble solution may require submersion of the object to be cleaned for a period of time. However, nanobubble production in which high velocity fluid is forced across the porous component to shear the gas bubbles may produce a highly turbulent bubble solution comprised of nanobubbles, microbubbles, and larger gas bubbles. The turbulence may cause a longer pathway through a fluid chamber allowing some of the bubbles to collide and aggregate to form larger bubbles, which may reduce the nanobubble concentration within the solution and which may reduce the overall efficiency of the nanobubble production process. Moreover, ozone gas has reduced stability at high pressure, and the high pressure required to overcome the backpressure from the fluid results in rapid decay of ozone before reaching injection location. The reduced gas stability coupled with the turbulence of the solution reduces the efficiency of ozone nanobubble production.

Embodiments of the present disclosure include a system including a vacuum-assisted, shear flow nanobubble generator that utilizes shear flow from a fluid and a vacuum supplied by a pump to shear gas from a surface of a porous component to form a plurality of stable nanobubbles. The nanobubble generator is configured to produce bubbles under negative pressure.

In some implementations, the nanobubble generator may include an enclosure with a fluid inlet, a gas inlet, and an outlet. Within the enclosure, the nanobubble generator may include a porous component including a chamber to receive a gas from the gas inlet and a plurality of gas-permeable openings through which the gas may be injected into the enclosure. A negative pressure is applied to the enclosure. As fluid flows across the porous component from the fluid inlet to the outlet, the negative pressure may cause the gas to be drawn into the fluid as it passes through the gas-permeable openings, facilitating shearing of the gas and formation of nanobubbles.

Generally, larger bubbles are easier to shear from the gas-permeable openings than smaller bubbles, requiring lower fluid flow rates and injected gas pressures (i.e., less shearing force). The diameter of a stable nanobubble may be larger at low or negative pressures than the diameter of the same bubble at a higher pressure due to the balance of internal and external pressure forces on the bubble surface. By forming bubbles at negative pressures, the vacuum allows the gas to form larger diameter bubbles, assisting the fluid flow to shear the gas from the gas-permeable openings. The bubble sizes may change as the pressure is increased (i.e., when the bubble solution passes through a pump) without adversely effecting stability of the bubbles. In an example, the bubble formed in the vacuum within the enclosure of the nanobubble generator may have a diameter of 200 nm or greater and the diameter of the bubble may shrink to a size of 120 nm or less when a positive external pressure is applied by surrounding fluid, producing a stable nanobubble solution.

In some implementations, a system may include a nanobubble generator and a pump. The nanobubble generator may include an inlet to receive a fluid at a first pressure, a gas input to receive a selected gas (such as ozone gas), and an output to provide a nanobubble solution to an inlet of a pump. The pump may apply a negative pressure to the outlet of the nanobubble generator, supplying a vacuum to assist in the formation of the nanobubbles. The pump may be configured to move the nanobubble solution from the nanobubble generator into a conduit or a tank at a second pressure that is greater than the first pressure.

It is generally undesirable to inject gas into a liquid stream at the input of a pump, since the injected gas may cause cavitation. Cavitation is a phenomenon in which bubbles within the fluid flow may collapse and generate shock waves, which may result in wear to mechanical parts within the pump. Embodiments of the present disclosure introduce a nanobubble solution to an inlet of the pump. The nanobubbles in the solution may shrink under pressure but otherwise remain stable and substantially homogenous within the solution, allowing the pump to move the solution without problems due to cavitation. If larger size bubbles are introduced into the fluid before a pump, these bubbles may be removed by a degassing filter.

By using a combination of a negative pressure and a shearing force due to the fluid flow, the fluid velocity in the fluid chamber can be reduced which increases nanobubble formation efficiency, and the resulting bubble solution is less turbulent than in conventional nanobubble generators. While it is widely believed that high pressure gas is needed to form the nanobubbles, the high gas pressure requires high velocity fluid flow to produce shearing effects, resulting in highly turbulent flow in a fluid chamber, encouraging collisions between the bubbles, and reduces overall efficiency of nanobubble formation. In the context of ozone nanobubbles, the high pressure of injected gas adversely impacts the stability of pressure sensitive gases prior to injection. By using fluid flow and negative pressure to encourage nanobubble formation, overall efficiency of nanobubble formation is improved and the bubbles in the resulting solution are produced more efficiently than in conventional systems, particularly with respect to gas bubbles formed from pressure sensitive gases such as ozone. Additionally, the flow speed is reduced with reduction in overall turbulence of the nanobubble solution is reduced, enhancing stability of the bubbles due to less aggregation.

In some implementations, a filter may be used to remove microbubbles and other bubbles that are larger than nanobubbles, producing a nanobubble solution including only nanobubbles and dissolved gas to flow into the pump. The filter may be implemented as an outgassing valve, a spin down filter, a membrane, another type of filter, or any combination thereof, which may be configured to remove bubbles larger than nanobubbles from the solution. The filter may be included within the nanobubble generator or may be provided between the nanobubble generator and the pump, depending on the implementation. By removing or degassing microbubbles and larger bubbles from the solution, the remaining nanobubbles may remain stable in the solution and may flow through the pump without causing cavitation. By increasing the contact time of the fluid with the larger bubbles, additional efficiencies can be obtained, such as sanitization of water moving though system with ozone gas injected.

FIG. 1 depicts a block diagram of a system 100 including a vacuum-assisted shear flow nanobubble generator 104, in accordance with certain embodiments of the present disclosure. The nanobubble generator 104 may include a first input (a fluid inlet), a second input (a gas inlet), and an output (a solution output). The first input may be configured to receive a fluid from a fluid source 102, such as a tank, a pipe, a faucet, or another fluid source. The fluid may include water, oil, or a chemical solution. The second input (the gas inlet) may be configured to receive a gas, such as ozone, oxygen, hydrogen, carbon dioxide, another gas, or any combination thereof from a gas source 106. The output (the solution outlet) may be configured to provide a nanobubble solution to an input of a pump 110, which may move the nanobubble solution into a conduit, one or more nanobubble solution tanks 112, another device, or any combination thereof.

In some implementations, the nanobubble generator 104 may include one or more fluid channels 114, through which the fluid may flow. The one or more fluid channels 114 may extend across a surface of one or more porous components 116. The surface of the porous component 116 may include a plurality of gas-permeable openings. The porous surfaces may be flat or cylindrical in shape. The porous component 116 may include a chamber configured to receive the gas from the second inlet. The fluid may flow across the openings at an angle that is generally orthogonal to the surface of the porous components 116. Each porous component 116 is arranged such that the gas introduced into a lumen or chamber of the porous component 116 is forced through or otherwise is drawn through the gas-permeable openings. The fluid flow across the openings in conjunction with a negative-pressure introduced by a pump 110 may cooperate to shear the gas to form nanobubbles and to draw the nanobubbles into the inlet of the pump 110.

The one or more filters 108 may be positioned between the nanobubble generator 104 and the pump 110. The one or more filters 108 may be configured to remove microbubbles and larger bubbles from the solution, so that the solution provided to the pump 110 includes dissolved gas and nanobubbles. In some implementations, the filter 108 may be implemented as a degassing valve configured to remove gas bubbles that are larger than a nanobubble using gravity and buoyancy of the larger bubbles, a porous membrane with nanobubble-sized openings, another type of filter, or any combination thereof, which allows only the nanobubbles and dissolved gas to be provided to the pump inlet. The one or more filters 108 are shown in phantom because they may be external to the nanobubble generator 104 or may be integrated within the nanobubble generator 104, depending on the implementation.

The fluid pressure at the fluid inlet of the nanobubble generator 104 may be less than the pressure at the outlet of the pump 110. In some implementations, the fluid source 102 may be a tank of water and the pressure in the nanobubble generator 104 is under vacuum with negative pressure. Other implementations are also possible.

In the illustrated example of FIG. 1, because the nanobubble generator 104 is under negative pressure due to the vacuum applied by the pump 110, the gas source 106 may inject the gas at a relatively low pressure such as 5-30 PSI. In contrast, if the nanobubble generator 104 were placed after the pump 110 (as in conventional systems) the pressure in the nanobubble generator 104 may be within a range of 10-25 PSI and the gas would need to be injected at a relatively high pressure of 20-45 PSI above the fluid pressure in the nanobubble generator in order to inject the gas and to shear off the nanobubbles from the openings in the porous component 116. In many cases, the gas pressure may need to be injected at a pressure of 60-90 PSI to produce the nanobubbles. By applying the negative pressure to the nanobubble generator 104 as in the system 100, the negative pressure in the nanobubble generator 104 allows for creation of nanobubbles with only a small difference in pressure between the pressure in the nanobubble generator 104 and the pressure of the gas, such as 15-20 PSI greater than the negative pressure. In an example, the gas pressure from the gas source 106 can be 15 PSI or less and the nanobubble generator 104 can still produce nanobubbles. Thus, the gas can be injected by the gas source 106 at a relatively low pressure. The lower gas pressure, the lower fluid flow rate, and the negative pressure within the nanobubble generator 104 produce less turbulence and fewer collisions, providing a more efficient, stable, nanobubble production process than traditional systems that place the nanobubble generator at the output of the pump.

The nanobubble generator 104 may be manufactured to have a variety of different form factors, including cylindrical form factors, rectangular form factors, and so on. One example of a rectangular form factor is described below with respect to FIG. 2.

Figure 2:
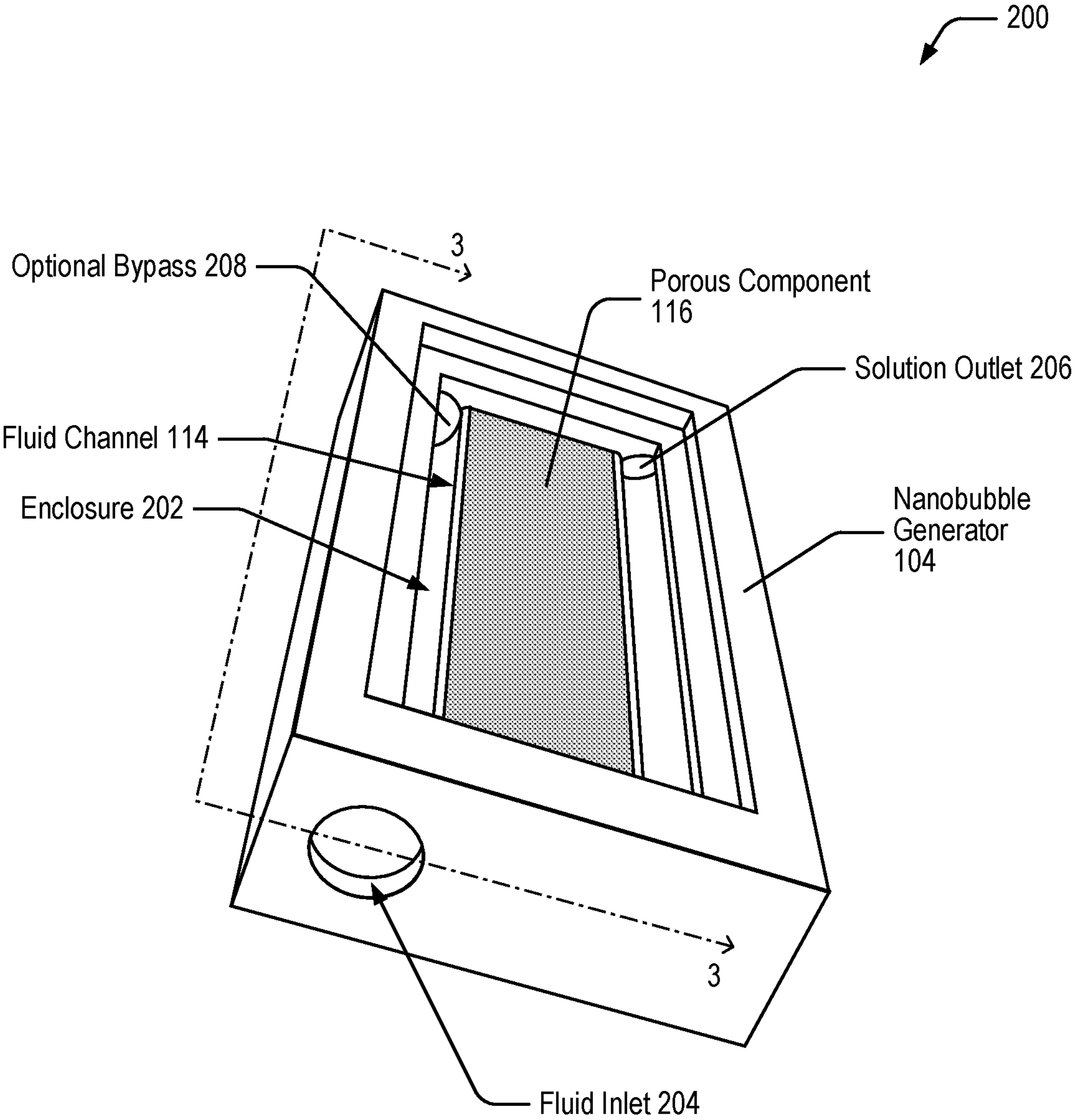
FIG. 2 depicts an isometric of a rectangular vacuum-assisted shear flow nanobubble generator with the fluid flow directed lengthwise, in accordance with certain embodiments of the present disclosure.

FIG. 2 depicts an isometric view 200 of a rectangular vacuum-assisted shear flow nanobubble generator 104 with the fluid flow directed lengthwise, in accordance with certain embodiments of the present disclosure. The nanobubble generator 104 may include an enclosure 202 sized to secure the porous component 118 and providing a fluid channel 114 to allow fluid flow across the porous component 116. The nanobubble generator 104 may include a fluid inlet 204, which may receive fluid from the fluid source 102. The nanobubble generator 104 may also include an outlet 206 to provide the solution to the pump 110. In some implementations, the nanobubble generator 104 may be bidirectional such that the fluid source 102 may be coupled to the inlet 204 or the outlet 206, and the pump 110 may be coupled to the outlet 206 or the inlet 204.

In some implementations, the nanobubble generator 104 may include an optional bypass opening 208. In such implementations, there may be a bypass portion of flow that allows for some of the fluid to transit directly through the nanobubble generator 104, which may be used as stabilizing pressure force applied after shearing of nanobubbles. The fluid may flow between the openings (inlet 204 and outlet 206) and across the porous component 116. The porous component 116 may include a chamber or lumen coupled to a gas inlet to receive the gas from a gas source 106 and may include a plurality of gas-permeable openings to allow the gas to seep through the openings to be sheered into nanobubbles by the fluid flowing across the surface of the porous component 116. The pump 110 may supply a negative pressure to the solution outlet 206 (or the fluid inlet 204, depending on the configuration). The negative pressure may facilitate bubble formation in conjunction with the fluid flow. The nanobubble generator 104 may have been originally designed to work under positive pressures installed after a pump. However, as previously discussed, by installing the nanobubble generator 104 in front of the pump 110 (i.e., before in the inlet of the pump 110), the nanobubbles can be produced in a negative pressure at relatively low fluid flow rates and relatively low gas pressures to produce a stable nanobubble solution with improved efficiency.

Figure 3A:
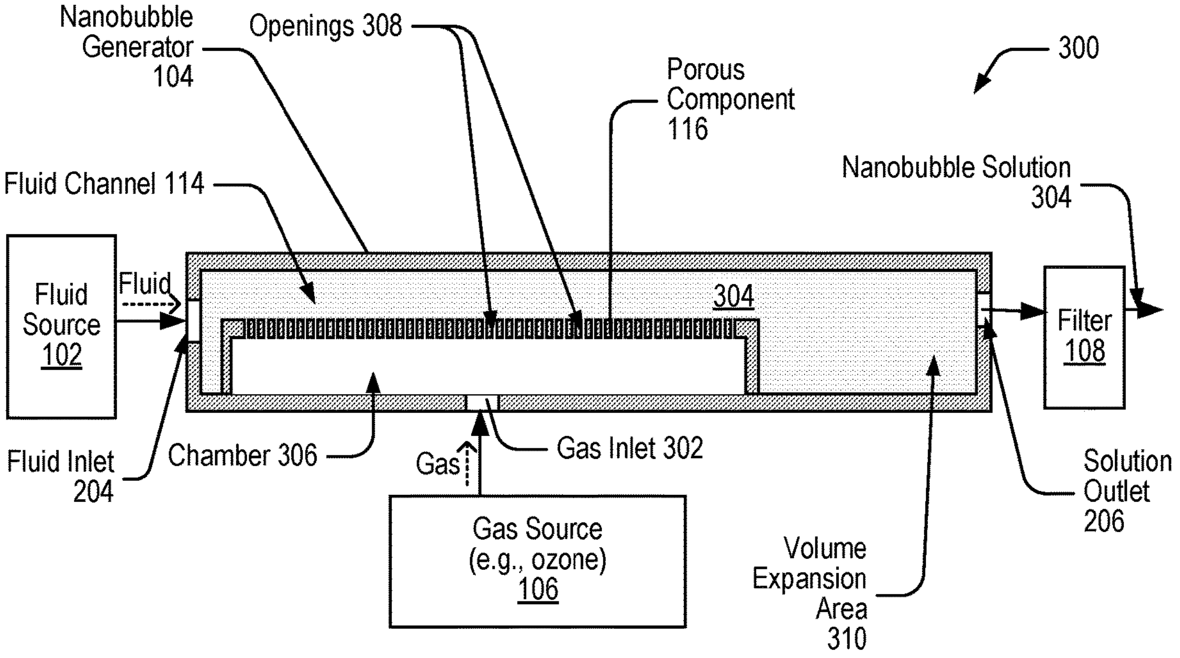
FIG. 3A depicts a cross-sectional diagram of an example of the nanobubble generator of FIG. 2 taken along line 3-3, in accordance with certain embodiments of the present disclosure.

FIG. 3A depicts a cross-sectional diagram 300 of an example of the vacuum-assisted shear flow nanobubble generator 104 of FIG. 2 taken along line 3-3, in accordance with certain embodiments of the present disclosure. The nanobubble generator 104 may include a fluid inlet 204 to receive a fluid from the fluid source 102 and a gas inlet 302 to receive gas from a gas source 106. The gas may flow into a chamber 306 within the porous component 116, which may include a surface of a plurality of gas-permeable openings 308. The openings 308 may be the surface of the porous medium 116. The gas may be drawn through the gas-permeable openings 308 and the fluid may flow across the surface of the porous component, shearing gas bubbles to form a bubble solution 304, which may move through a volume expansion area 310 and a solution outlet 206. The nanobubble generator 104 may under negative pressure from the pump 110 and the bubble solution 304 may be drawn through a filter 108 by the pump 110. The solution provided at the output of the pump 110 may be a nanobubble solution, which may include the fluid, nanobubbles, and dissolved gas. Bubbles larger than nanobubbles may have been removed by the filter 108.

After the bubbles are sheared off of the surface of the porous component 116, the bubble solution flows into the volume expansion area 310, which may help the bubbles to separate from one another and to restore the pressure and velocity of the solution to levels that correspond to the flow rate and pressure of the fluid and the fluid inlet 204. In some instances, the volume expansion area 310 may assist in stabilizing the bubbles after formation and may operate to allow the bubbles to separate from one another, homogenizing the bubble solution.

The pump 110 may apply a negative pressure such that the fluid channel 114 within the nanobubble generator 104 is at a negative pressure. The negative pressure may assist the shear flow in tearing the bubbles away from the gas-permeable openings 308. Additionally, the gas bubble may expand into the negative pressure, creating larger diameter but stable nanobubbles in the vacuum. As pressure is increased when the nanobubble solution passes through the pump 110, the diameters of the nanobubbles may decrease while remaining stable and without cavitation.

In the example of FIG. 3A, a filter 108 is provided that external to the nanobubble generator 104. The filter 108 may be configured to remove microbubbles and other bubbles that are larger than a selected size of nanobubbles from the bubble solution to ensure that the solution only includes nanobubbles and dissolved gas. While the filter 108 is shown to be external to the nanobubble generator 104, in some implementations such as the example shown in FIG. 3B, the filter 108 may be incorporated in the nanobubble generator 104.

Figure 3B:
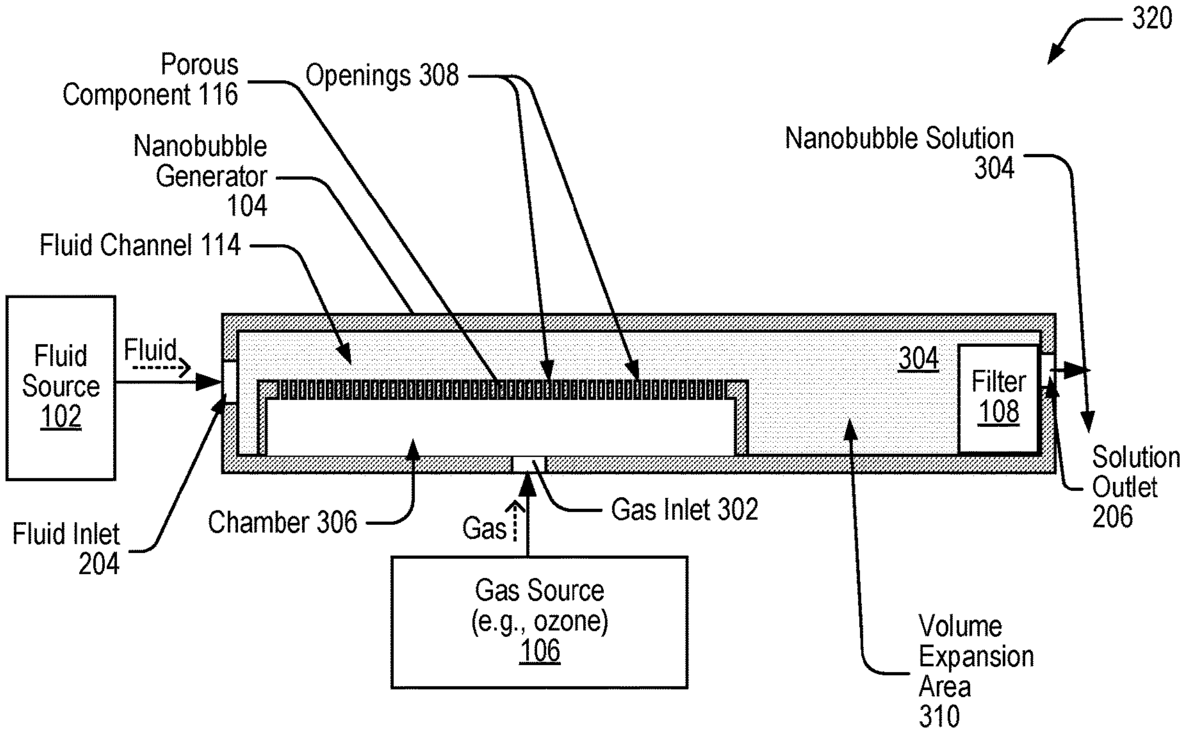
FIG. 3B depicts a cross-sectional diagram of an example of the nanobubble generator of FIG. 2 taken along line 3-3 and including an integrated filter, in accordance with certain embodiments of the present disclosure.

FIG. 3B depicts a cross-sectional diagram 320 of an example of the nanobubble generator 104 of FIG. 2 taken along line 3-3 and including a filter 108, in accordance with certain embodiments of the present disclosure. In this example, the nanobubble generator 104 includes all the elements of the nanobubble generator 104 in FIGS. 1-3A. Further, the filter 108 is integrated within the nanobubble generator 104 instead of being external to the nanobubble generator 104 as shown in FIGS. 1-3A.

Figure 4A:
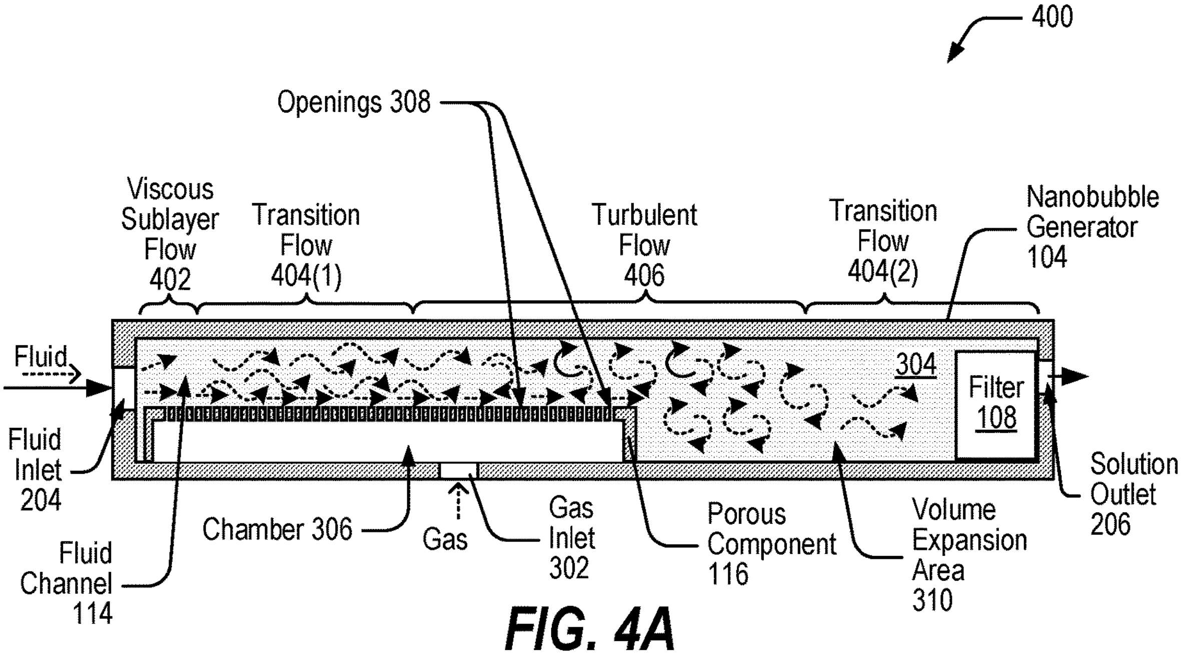
FIG. 4A depicts a cross-sectional view of a nanobubble generator including fluid flow regions, in accordance with certain embodiments of the present disclosure.

FIG. 4A depicts a cross-sectional view 400 of a nanobubble generator 104 including fluid flow regions, in accordance with certain embodiments of the present disclosure. In this example, the fluid may flow from the fluid inlet 204 to the outlet 206 across the gas-permeable openings 308 of the porous component 116. As the fluid enters the nanobubble generator 104, the fluid may have a substantially laminar flow 402, as indicated by the straight line arrows. As the fluid flows across the gas-permeable openings 308, the fluid may include a transition flow in the area indicated at 404(1) as well as a sublayer "cleaning" flow across the gas-permeable openings 308.

As the nanobubbles are formed by the shearing fluid flow, the transition flow 404(1) transitions into a turbulent flow as indicated at 406, as the nanobubbles flow into the volume expansion area 310. As the nanobubble solution 304 flows toward and into the outlet 206, the turbulent flow 406 may transition back into a transition flow 404(2) and possibly a laminar flow.

Figure 4B:
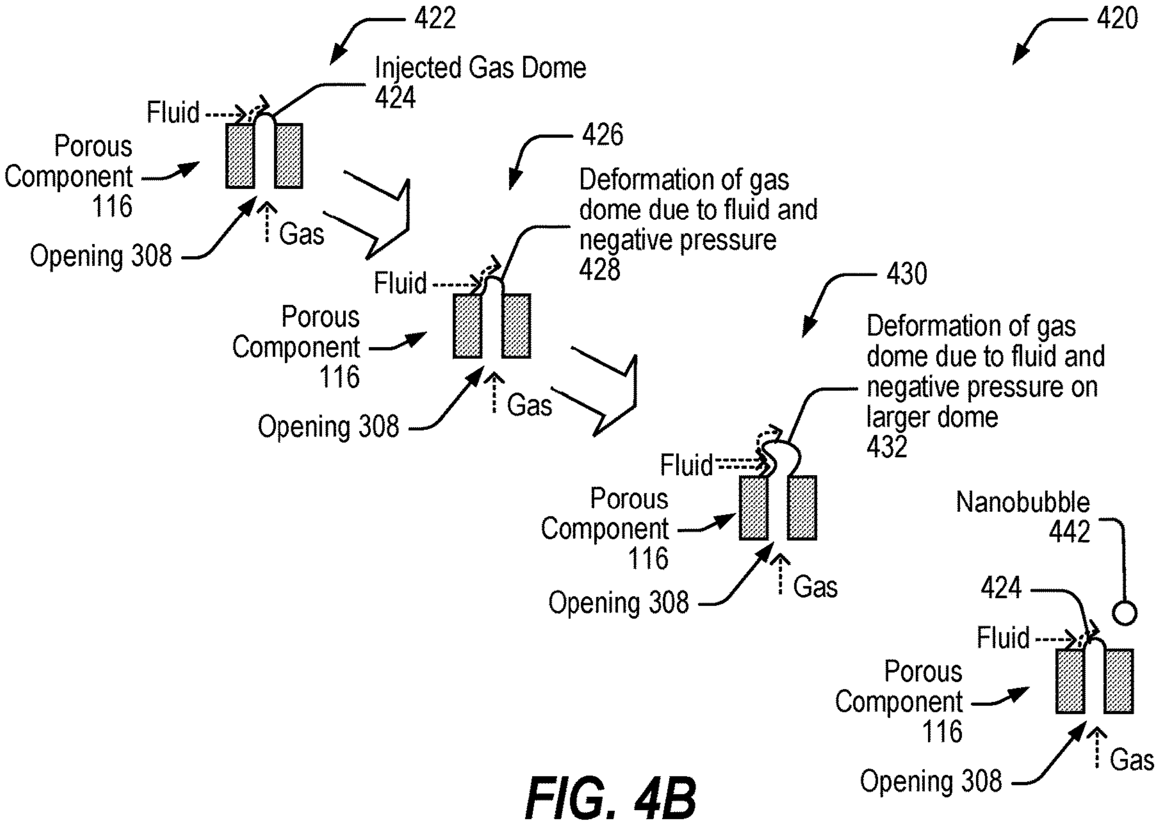
FIG. 4B depicts a sequence illustrating nanobubble formation using the nanobubble generator of FIG. 4A.

FIG. 4B depicts a sequence 420 illustrating nanobubble formation using the nanobubble generator of FIG. 4A. The sequence 420 may include a first phase at 422 in which the gas flows through an opening 308 of the porous component 116. The gas may push into the fluid, forming an injected gas dome 424, which may begin to interact with the viscous sublayer flow 402. At 426, the viscous sublayer fluid flow 402 may cause deformation of the gas dome due to fluid pressure and the negative pressure from the pump 110 may begin to pull or draw the gas into the fluid flow and toward the outlet 206, as shown at 428.

At 430, the gas has pushed further into the fluid flow producing a larger gas dome, as shown at 432. The viscous sublayer flow 402 further deforms the gas dome 432, and the gas dome 432 causes some transition flow 404. The negative pressure from the pump 110 and the shear force of the viscous sublayer fluid flow 402 cooperate to further deform the gas dome at 432.

At 434, the viscous sublayer fluid flow 402 may shear the gas from the opening 308, producing a bubble 442. The bubble 442 may move into the fluid flow and separate from a new gas dome 424 that is forming at the opening 308.

In the examples above, nanobubbles are formed by the interaction of the fluid flowing across the surface of the porous component 116 and the negative pressure applied by the pump 110. The size of bubble created is controlled by the balance of forces of pressure injected behind the gas bubble, back pressure in the fluid chamber, shear force from the fluid flow, and surface tension of the gas-liquid interface. The surface charge may tend to expand the diameter of the bubble. Additionally, under negative pressure, there is little or no backpressure to oppose expansion of the bubble, allowing the gas to expand into the fluid flow to produce bubbles that may contract as fluid pressure increases. An illustrative example of the formation, separation, and contraction of the bubbles is described below with respect to FIG. 5.

Figure 5:
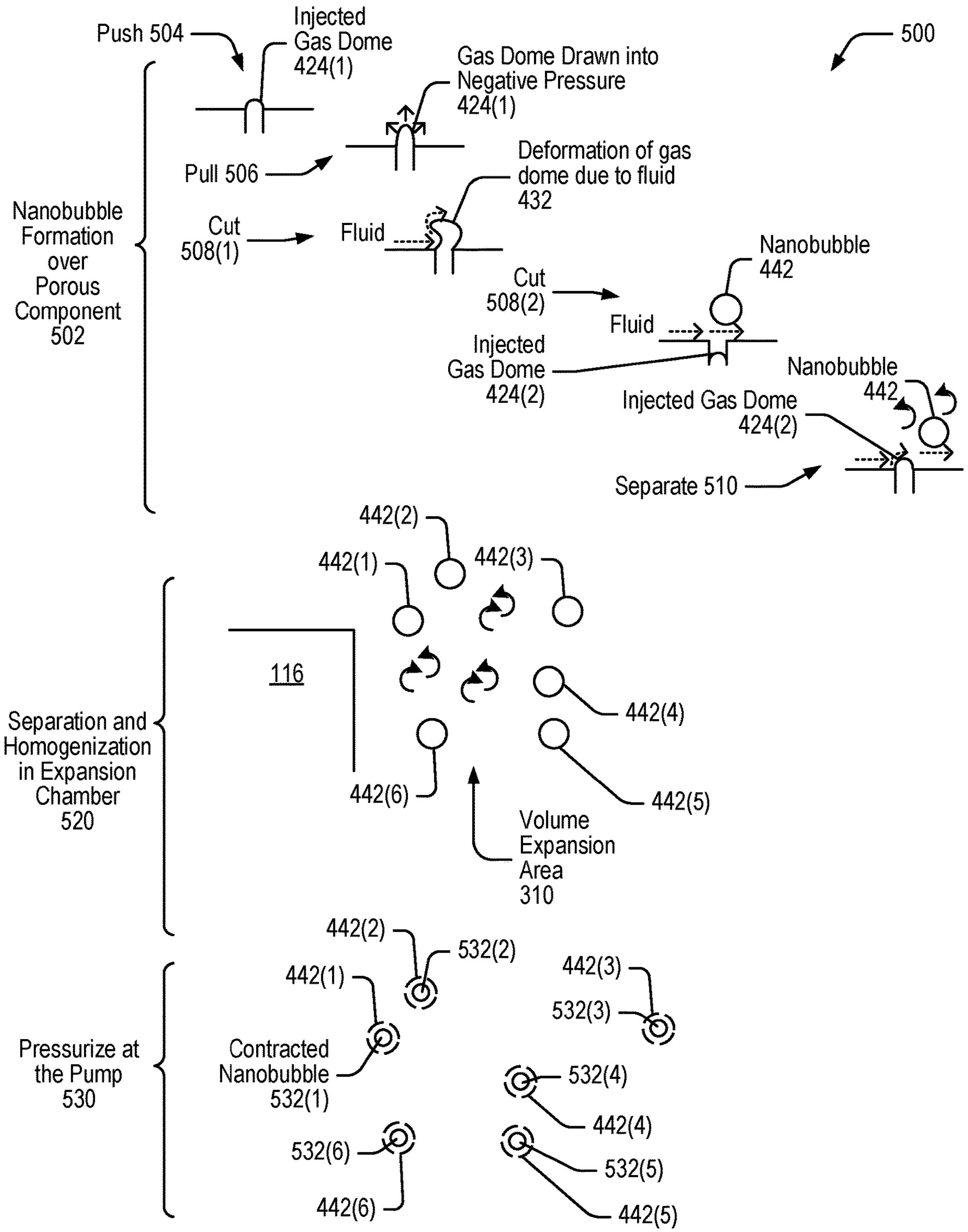
FIG. 5 depicts a sequence illustrating vacuum assisted shear-flow nanobubble formation, separation, and pressurization, in accordance with certain embodiments of the present disclosure.

FIG. 5 depicts a sequence 500 illustrating vacuum assisted shear-flow nanobubble formation, separation, and pressurization, in accordance with certain embodiments of the present disclosure. At 502, the nanobubbles are formed over the porous component 116. For example, in a push stage 504, the gas pressure begins to push on the injected gas dome 424(1). The gas may expand rapidly into the fluid flow, even at low gas pressures, because there is no backpressure from the fluid.

In a pull stage 506, the gas bubble expands into the fluid chamber as a result of the negative pressure pulling on the gas bubble. As the gas dome is drawn into the fluid chamber by the negative pressure it deformed by the shearing force produced by the viscous sublayer fluid flow (402 in FIG. 4A). The negative pressure enables the absence of backpressure which facilitates gas bubble expansion into the fluid flow.

In a cut stage 508, the fluid flow cuts the gas dome to form a nanobubble 442. At 508(1), the viscous sublayer fluid flow may deform a portion of the gas dome near the surface of the porous component 116. At 508(2), the viscous sublayer fluid flow may shear the gas dome from the opening to produce the nanobubble. In general, the fluid flow rate does not need to be as fast as in conventional nanobubble generators because the fluid pressure does not drive the gas back into the porous medium.

In a separate stage 510, the turbulence of the fluid flow, the negative pressure in the fluid chamber, the positive pressure in the gas bubble, and the surface charge of the nanobubble 442 cooperate to separate the nanobubble 442 from the porous component 116 and from other bubbles in the fluid solution. The turbulent flow may prevent aggregation and facilitate separation of the nanobubbles 442 from one another.

At 520, the nanobubbles separate from one another and spread out within the solution in the volume expansion area 310 of the nanobubble generator 104. In this stage, the turbulence of the fluid flow and the surface charge of each nanobubble cooperate to mix the nanobubbles within the solution to produce a relatively homogenous fluid solution. Within the volume expansion area 310, the nanobubbles 442 are further separated from one another and may stabilize as the fluid pressure is slightly higher but still negative in the volume expansion area 310.

At 530, the pressurization by the pump 110 may cause the nanobubbles 442 to contract to form smaller-diameter stable nanobubbles 532. In general, during the production stage at 502 and during the separation and homogenization stage 520, the nanobubbles 442 are under a negative pressure in which there is little or no backpressure to oppose gas expansion. As pressure is applied by the pump 110, the fluid pressure applies a backpressure that may cause the nanobubbles to contract to a smaller-diameter state in which the nanobubbles 532 are at equilibrium with respect to opposing gas and fluid pressures, producing a stable nanobubble solution.

Figure 6A:
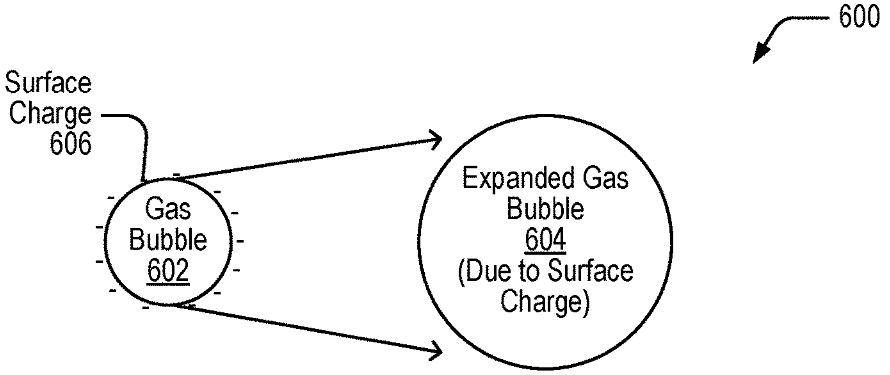
FIG. 6A depicts a gas bubble and an expanded version of the gas bubble due to surface charge, in accordance with certain embodiments of the present disclosure.

FIG. 6A depicts a view 600 of a gas bubble 602 and an expanded version of the gas bubble 604 due to surface charge, in accordance with certain embodiments of the present disclosure. In this example, the nanobubbles are stable from a balance of forces at the gas-liquid boundary. The forces may include molecular bonding (likely between hydrogen and corresponding affinity groups), surface charge from polar orientation of molecules at the surface boundary, internal pressure from the gas volume, and backpressure from the liquid. The nanobubble surface charges 606 may tend to expand the gas bubble 602 to produce the gas bubble 604.

Figure 6B:
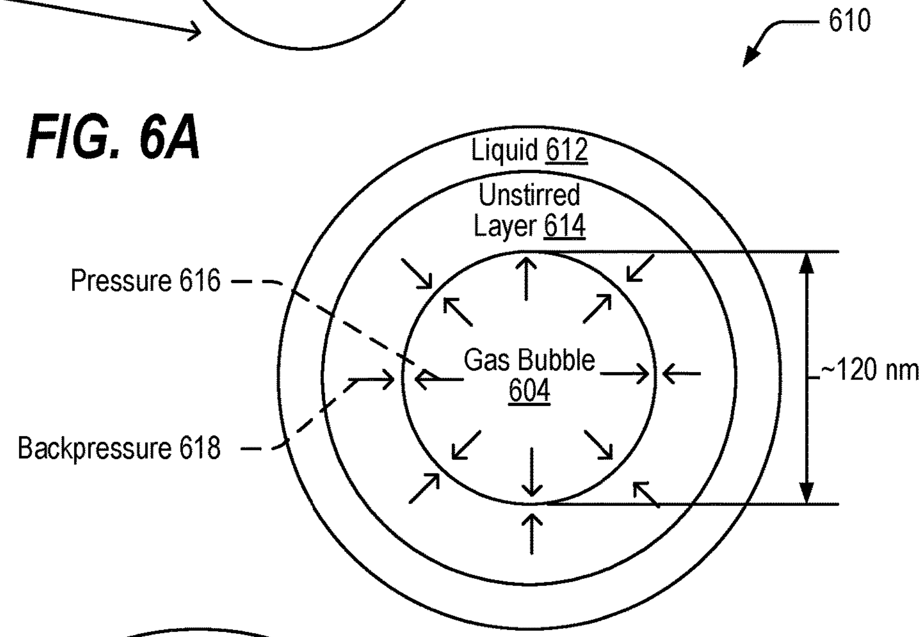
FIG. 6B depicts a gas bubble in a water-based solution, under pressure, and at equilibrium, in accordance with certain embodiments of the present disclosure.

FIG. 6B depicts a view 610 of a gas bubble 604 in a liquid-based solution, under pressure, and at equilibrium, in accordance with certain embodiments of the present disclosure. In this example, the gas bubble 604 may be within a water solution 612 that may include an unstirred layer 614 immediately surrounding the surface of the gas bubble 604. The gas bubble 604 includes internal pressure 616 produced by the gas volume and surface charge pressure produced by the polar orientation of the gas molecules. The liquid 612 applies a backpressure 618, which opposes expansion of the volume of the nanobubble 604.

Figure 6C:
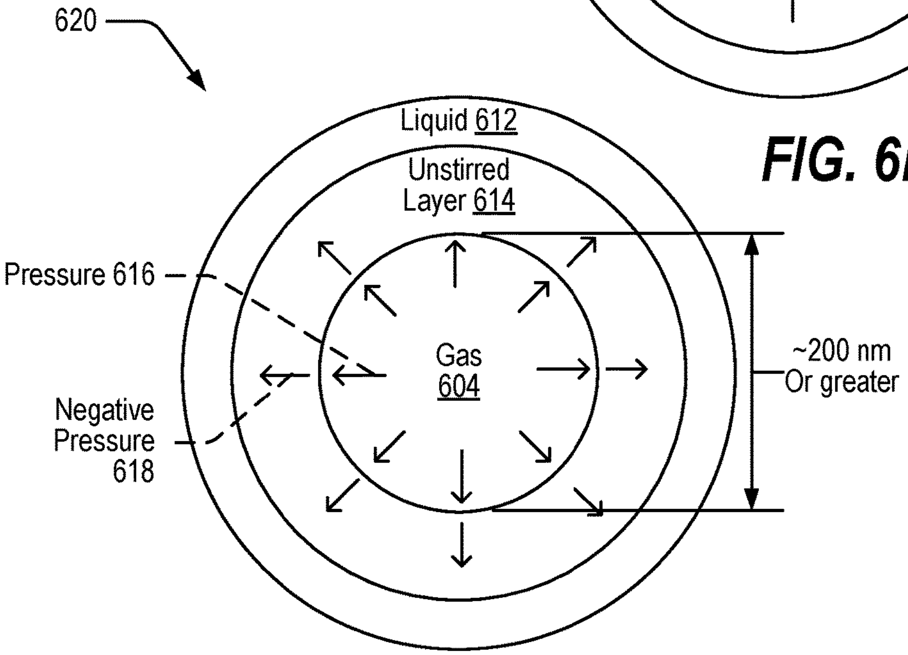
FIG. 6C depicts a gas bubble in a water-based solution and under negative pressure, in accordance with certain embodiments of the present disclosure.

FIG. 6C depicts a view 620 of a gas bubble 604 in a liquid-based solution and under negative pressure, in accordance with certain embodiments of the present disclosure. In this example, the negative pressure 618 may encourage expansion of the gas 604 instead of resisting the pressure 618 of the gas bubble 604. The elimination of the backpressure from the water 612 by applying negative pressure may enable expansion of the nanobubbles 604 during formation, enhancing the efficiency of the nanobubble generation process.

As previously discussed, the solution outlet 206 of the nanobubble generator 104 may be coupled to the input of the pump 110, which may provide a negative pressure to the nanobubble generator 104. The fluid flow from the inlet 204 to the outlet 206 across the surface of the porous component 116 that includes a plurality of gas-permeable openings 308. The combination of the fluid flow and the negative pressure may facilitate nanobubble formation. In particular, the negative pressure may cause the gas volume to increase, making it easier for the fluid flow to shear the bubbles away from the surface of the porous component.

Unlike conventional nanobubble generators that require a high pressure (80 PSI or greater) fluid flow to shear the nanobubbles, the nanobubble generator 104 may generate nanobubbles at lower gas pressures (e.g., 5-30 psi) and lower fluid shear flow velocities (e.g., 1.5 m/s to 2.0 m/s). The negative pressure applied by the pump 110 may enhance the efficiency of nanobubble formation, enabling reduced requirements for fluid flows and gas pressures while still enabling nanobubble formation. Additionally, a pure nanobubble solution may be produced which may be beneficial for certain applications where the floatation provided by larger bubbles is disadvantageous to the application.

Figure 7:
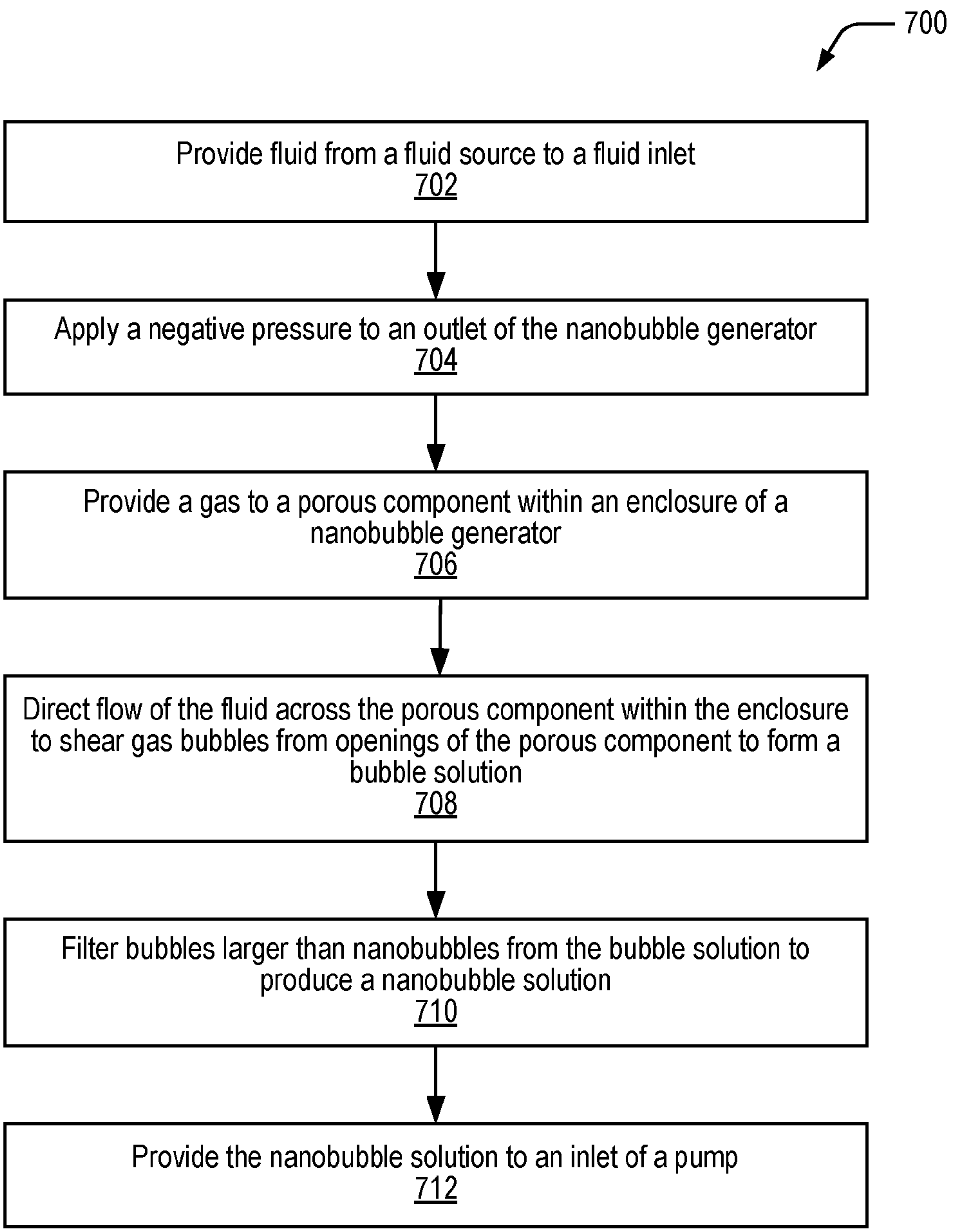
FIG. 7 depicts a method of generating a nanobubble solution using a rectangular vacuum-assisted shear flow nanobubble generator, in accordance with certain embodiments of the present disclosure.

FIG. 7 depicts a method 700 of generating a nanobubble solution using a vacuum-assisted shear flow nanobubble generator 104, in accordance with certain embodiments of the present disclosure. In the following discussion, the method 700 is described as if the operations occur in a sequence; however, it should be appreciated that some or all the operations may occur substantially simultaneously.

At 702, the method 700 may include providing fluid from a fluid source 102 to a fluid inlet 204. In some implementations, the fluid may include water, which may be distilled or purified. In other implementations, the fluid may be selected based on desired fluid properties, such as viscosity, chemical content, and so on. The fluid may be provided to the fluid inlet 204 of the nanobubble generator 104. However, in some implementations, the nanobubble generator 104 may be bidirectional such that the fluid source may be coupled to the inlet 204 or the outlet, and the pump 110 may be coupled to the other of the outlet 206 or the inlet 204.

At 704, the method 700 may include applying a negative pressure to an outlet 206 of the nanobubble generator 104. The negative pressure may be applied by a pump 110 drawing the fluid or the fluid solution 304 through the outlet 206. In some implementations, by changing the rate of the pump 110, the negative pressure may be increased or decreased to provide a selected negative pressure. As the rate of the pump 110 is increased, the negative pressure increases. The negative pressure may facilitate nanobubble formation within the nanobubble generator 104.

At 706, the method 700 may include providing a gas to a porous component 116 within an enclosure 202 of a nanobubble generator 104. The gas may include one or more of oxygen, ozone, carbon dioxide, hydrogen, nitrogen, another gas, or any combination thereof. In some implementations, the gas may be provided by connecting a gas source 106 to a gas inlet 202 of the nanobubble generator 104 and opening a valve to allow the gas from the gas source 106 to flow to the gas inlet 202. The gas may be provided at a relatively low pressure of 5-30 PSI.

At 708, the method 700 may include directing the fluid across the porous component 116 within the enclosure 202 to shear gas bubbles from openings 302 of the porous component 116 to form a bubble solution 304. The fluid may be directed across the porous component 116 by providing one or more fluid channels 114 through which fluid may flow. In some implementations, the fluid may flow parallel to and across a surface of the porous component 116 that includes the openings 302 to shear the bubbles.

At 710, the method 700 may include filtering bubbles larger than nanobubbles from the bubble solution 304 to produce a nanobubble solution. In some implementations, filtering may be performed by one or more of gravity or a filter. The filter may include one or more of a degassing valve, a membrane with nanobubble sized pores, another type of filter, or any combination thereof. The filter may be configured to separate microbubbles and larger bubbles from the solution 304, leaving a nanobubble solution comprised of dissolved gas and nanobubbles, which may be provided to the fluid outlet 206.

At 712, the method 700 may include providing the nanobubble solution to an inlet of a pump 110. The nanobubble solution may be provided to the pump 110 by coupling the pump 110 to the outlet 206 and activating the pump 110. The pump 110 may apply a negative pressure to draw the nanobubble solution from the outlet 206 of the nanobubble generator 104 into an inlet of the pump 110. Other implementations are also possible.

As mentioned above, the operations described in the method 700 may occur substantially simultaneously. For example, upon activation of the system 100, the fluid may be provided to the fluid inlet 204, the gas may be provided to the gas inlet, and the negative pressure be applied to the outlet 206 by the pump 110. Upon providing of the fluid and the gas, the fluid may flow across the porous component 116 producing bubbles and the filtering of bubbles larger than nanobubbles from the solution may begin. Thus, the operations described in 702-708 may occur substantially concurrently followed by the filtering at 710 and the receiving of the nanobubble solution 304 at the inlet of the pump 110.

The method 700 is illustrative only and is not intended to be limiting. In some implementations, operations may be combined or may be omitted without departing from the scope of the disclosure. For example, the filtering of the bubbles may be performed by the geometry of the nanobubble generator 104 without a separate filtering step. Other implementations are also possible.

In conjunction with the systems, devices, and methods described above with respect to FIGS. 1-7, a system may include a nanobubble generator 104 that uses a shearing force applied by a fluid received through one or more fluid inlets 204 and a negative pressure applied to an outlet 206 by a pump 110 to provide a vacuum-assisted shear flow nanobubble generator system. In some implementations, the system may include a nanobubble generator 104, a filter 108 to remove bubbles larger than nanobubbles, and a pump 110 to apply a negative pressure to draw the nanobubble solution into an inlet of the pump 110.

In some implementations, the filter 108 may be incorporated in the nanobubble generator 104. In other implementations, the filter 108 may be external to the nanobubble generator 104.

By providing the nanobubble generator 104 in front of the pump 110, the negative pressure supplied by the pump 110 may assist in the nanobubble formation process by forming nanobubbles in a vacuum. Further, the flow of the fluid at the inlet 204 may be lower than that of conventional nanobubble generators because the negative pressure from the pump 110 assists the bubble formation, unlike conventional devices that form nanobubbles using only the shearing force. Further, the injected gas pressure at the gas inlet 302 may be lower than in conventional nanobubble generators. In an example, a conventional nanobubble generator may require injected gas pressures of 50 PSI or greater, while the nanobubble generator 104 may produce nanobubbles under vacuum (e.g., 1-10 mm Hg), enabling low gas injection pressures of 10 to 30 PSI.

While it is generally undesirable to inject gas at the inlet of the pump 110 because cavitation from the bubbles may damage the pump 110, by filtering the microbubbles and larger bubbles from the bubble solution using the filter 108, the nanobubbles within the resulting nanobubble solution remain stable and do not cause cavitation, allowing the pump 110 to move the nanobubble solution reliably and without damage from the bubbles. Further, the negative pressure may facilitate nanobubble production by enabling larger size nanobubbles at low pressure, which may shrink in response to increasing pressure without collapsing. The required gas injection pressure is low, allowing the method to be efficient with pressure sensitive gases. Further, the lower shear speed fluid flow and the negative pressure produce a nanobubble solution with less turbulence than the higher pressure conventional systems, which allows for a more stable nanobubble solution and a more efficient nanobubble production process.

Although the present invention has been described with reference to preferred embodiments, workers skilled in the art will recognize that changes may be made in form and detail without departing from the scope of the invention.

What is claimed is:

1. A system comprising:
a gas source;
a nanobubble generator including a fluid inlet to receive a fluid, a gas inlet coupled to the gas source to receive a gas from the gas source, and a nanobubble generator outlet, the nanobubble generator further including a porous component fluidly coupled to the gas inlet and including a plurality of gas-permeable openings across which the fluid flows from the fluid inlet through a fluid channel past the porous component towards the nanobubble generator outlet; and
a pump coupled to the nanobubble generator;
wherein a gas pressure and a pressure provided by the pump cooperate to shear nanobubbles from the plurality of gas-permeable openings to form a first nanobubble solution in the fluid channel;
wherein the nanobubble generator further includes an expansion region, disposed between the porous component and the nanobubble generator outlet, through which the fluid flows after flowing through the fluid channel past the porous component, wherein the expansion region is larger in at least one dimension than the fluid channel in the same at least one dimension and operates to allow bubbles to separate from each other within the fluid while flowing through the expansion region.

2. The system of claim 1, wherein the pump provides a negative pressure to the porous component via the nanobubble generator outlet.

3. The system of claim 1, wherein the gas source provides gas comprising ozone.

4. The system of claim 1, wherein the gas source provides gas comprising oxygen.

5. The system of claim 1, wherein the gas source provides gas comprising hydrogen.

6. The system of claim 1, wherein the gas source provides gas comprising a hydrocarbon.

7. The system of claim 1, wherein the gas source provides gas comprising carbon-dioxide.

8. A system comprising:
a gas source;
a pump; and
a nanobubble generator including a fluid inlet to receive a fluid, a fluid channel coupled to the fluid inlet, a gas inlet coupled to the gas source to receive a gas from the gas source, a nanobubble generator outlet, the nanobubble generator further including a porous component disposed adjacent to the fluid channel, the porous component including:
a chamber coupled to the gas inlet;
a surface across which the fluid in the fluid channel flows; and
a plurality of gas-permeable openings extending from the chamber to the surface;
wherein a gas pressure and a pressure provided by the pump cooperate to shear nanobubbles from the plurality of gas-permeable openings to form a bubble solution in the fluid channel including nanobubbles and dissolved gas;
wherein the nanobubble generator further includes an expansion region, disposed between the porous component and the nanobubble generator outlet, through which the fluid flows after flowing through the fluid channel past the porous component, wherein the expansion region is larger in at least one dimension than the fluid channel in the same at least one dimension and operates to allow bubbles to separate from each other within the fluid while flowing through the expansion region.

9. The system of claim 8, wherein the pump applies a negative pressure to the porous component.

10. The system of claim 8, wherein the fluid comprises water and the gas comprises one or more of nitrogen, carbon dioxide, air, ozone, oxygen, hydrogen or hydrocarbon gas.

11. A system comprising:
a nanobubble generator including a fluid inlet coupled to a fluid channel to receive a fluid from a fluid source, a gas inlet to receive a gas from a gas source, the gas comprising at least one of ozone, oxygen, carbon dioxide, hydrogen, or a hydrocarbon, and a nanobubble generator outlet, the nanobubble generator further including a porous component fluidly coupled to the gas inlet and including a surface including a plurality of gas-permeable openings, the fluid to flow through the fluid channel across the surface of the porous component towards the nanobubble generator outlet to shear the gas from the plurality of gas-permeable openings to form a bubble solution;

wherein the nanobubble generator further includes an expansion region, disposed between the porous component and the nanobubble generator outlet, through which the fluid flows after flowing through the fluid channel past the porous component, wherein the expansion region is larger in at least one dimension than the fluid channel in the same at least one dimension and operates to allow bubbles to separate from each other within the fluid while flowing through the expansion region.

12. The system of claim 11, wherein the gas source provides the gas to the gas inlet at a positive pressure.

* * * * *